May 31, 1927.  
J. N. MORTIMER  
1,630,351  
VALVE FOR PLUMBING FIXTURES  
Filed March 29, 1926
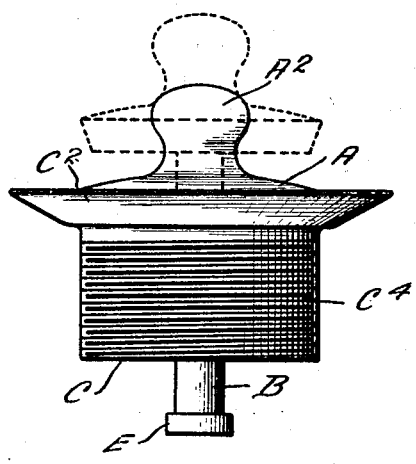
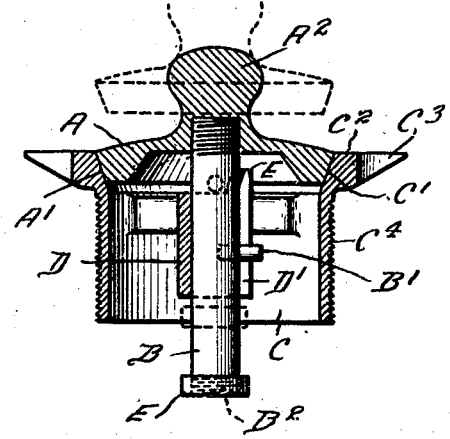
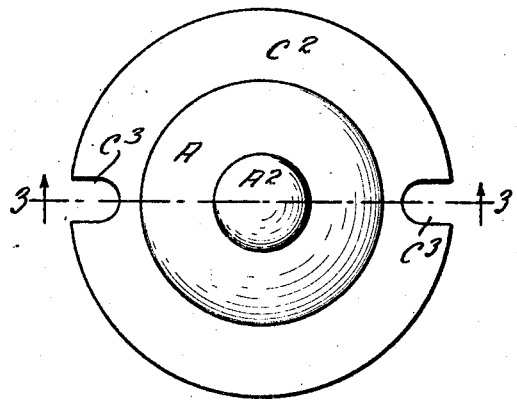
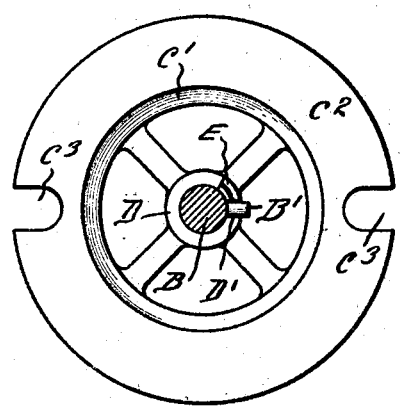
INVENTOR  
John N. Mortimer Patented May 31, 1927.

1,630,351

UNITED STATES PATENT OFFICE.

JOHN N. MORTIMER, OF LAKEWOOD, OHIO, ASSIGNOR TO THE CENTRAL BRASS MANUFACTURING COMPANY, OF CLEVELAND, OHIO, A CORPORATION OF OHIO.

VALVE FOR PLUMBING FIXTURES.

Application filed March 29, 1926. Serial No. 98,088.

This invention relates generally to plumbing fixtures and more particularly to a waste valve for use in connection with bath tubs and lavatories, sinks and the like.

The object of the invention is to provide an exceedingly cheap and simple form of valve which can be quickly and easily opened and retained open, and which can be as easily closed.

Another object is to provide a valve embodying these characteristic advantages which cannot be removed from the tub or lavatory and a still further object is to provide a device which can be quickly and easily inserted and connected to the bath tub or lavatory.

With these objects in view the invention consists in the novel features of construction all of which will be fully described hereinafter and set forth in the appended claim.

In the drawing forming a part of this specification Fig. 1 is a side elevation of my improved device ready for insertion into a bath tube or lavatory the device being shown closed in full lines and open in dotted lines; Fig. 2 is a top plan view of the same; Fig. 3 is a vertical sectional view taken on the line 3—3 of Fig. 2, the valve being shown closed in full lines and open in dotted lines; and Fig. 4 is a plan view of the valve seat ring with the stem shown in section.

In the practical embodiment of my invention I employ a valve A having a tapering edge A' and an operating knob A². This valve is provided with a centrally disposed depending stem B which is preferably threaded into the valve as shown, although it will be understood that it can be made integral if so desired or connected in any other suitable manner.

In connection with the valve I employ a ring C having the tapering seat C' upon which the tapered edge A' of the valve seats. The ring is also provided with an outwardly projecting flange C² which is preferably notched as shown at C³ in order that the ring may be screwed into the proper connecting member in the bath tub, lavatory or sink, the exterior of the ring being screw threaded as shown at C⁴ for such engagement.

The ring is formed with a spider having the central hub portion D in which the stem B of the valve works. This central or hub portion is longitudinally slotted as shown at D' and in which works the laterally projecting pin B' carried by the stem of the valve. At one side of the slot and adjacent thereto the hub is formed with an upwardly projecting stop lug E against which the pin E' is adapted to contact in order to limit the movement thereof. A stop collar E is preferably screwed or otherwise affixed to the lower end of the stem to prevent the valve being disconnected from the ring thus preventing its accidental misplacement or loss.

In operation, the valve is moved up and down to open and close the same, the stem moving up and down in the central bore or protruded spider and guided in such up and down movements by means of the laterally projecting pin working in the vertical slot in the hub of the spider. The stop collar will limit the upward movement of the valve and then by rotating the valve and its stem, the pin can be moved around on top of the hub of the spider after it has been moved up a sufficient distance and can be carried around until it contacts with the stop plug E. It then can be left in this open position as long as desired.

When it is desired to close the valve it is only necessary to rotate the same carrying the stem around until it comes into register once more with the vertical slot when the valve can be dropped down upon its seat, the pin sliding downwardly in the slotted hub of the spider.

It will thus be seen that I provide an exceedingly cheap and simple appliance which can be quickly and easily affixed to the bath tub, lavatory or sink and in which the valve can be quickly and easily raised or lowered and can be maintained in an open position by simply rotating the same so as to bring the pin around to its proper supporting position.

Having thus described my invention, what I claim is:—

As a new article of manufacture, a waste valve for bathtubs comprising a valve provided with a stem, said stem having a laterally projecting pin intermediate its ends and a laterally projecting stop at its lower end, a ring having a seat for the said valve and a laterally extending flange at the upper end of the sleeve, said flange having one or more notches, said ring having a depending externally threaded sleeve and a spider arranged within the sleeve and having a centrally bored hub in which the valve stem works, said centrally bored hub being vertically slotted, and a stop lug carried by the spider and with which the laterally projecting pin is adapted to engage to limit the rotation of said stem.

In testimony whereof, I hereunto affix my signature.

JOHN N. MORTIMER.